Feb. 2, 1965   H. M. NEER   3,168,725
ELECTRICAL MEASURING APPARATUS
Filed Feb. 20, 1962   5 Sheets-Sheet 1

FIG. I

INVENTOR.
HAROLD M. NEER
BY
Young + Quigg
ATTORNEYS

Feb. 2, 1965    H. M. NEER    3,168,725
ELECTRICAL MEASURING APPARATUS
Filed Feb. 20, 1962    5 Sheets-Sheet 3

INVENTOR
HAROLD M. NEER
BY Young & Quigg
ATTORNEYS

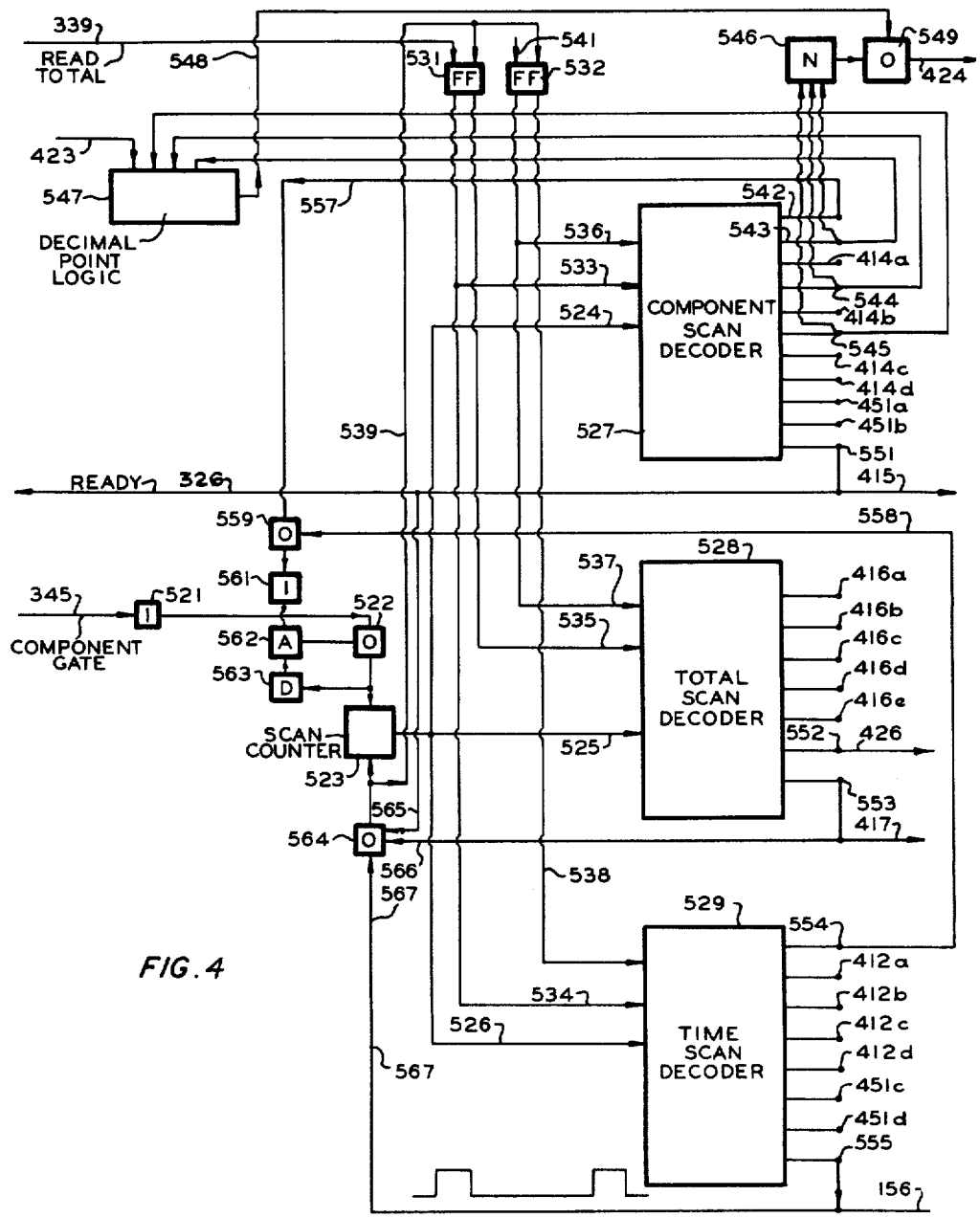

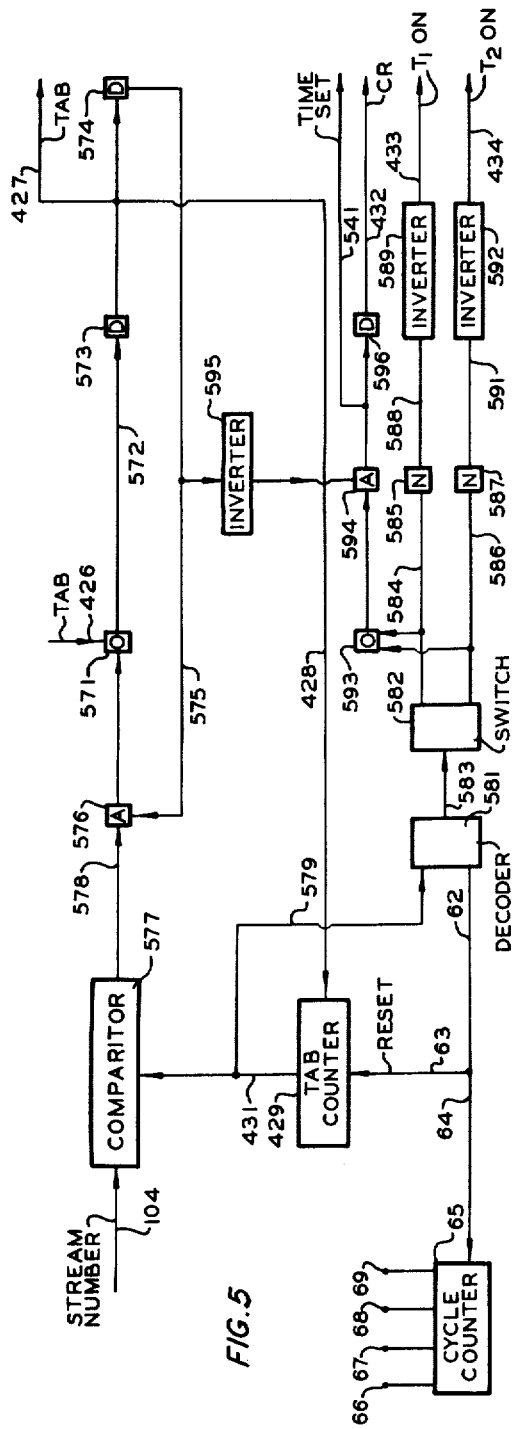

United States Patent Office 3,168,725
Patented Feb. 2, 1965

3,168,725
ELECTRICAL MEASURING APPARATUS
Harold M. Neer, Bartlesville, Okla., assignor to Phillips Petroleum Company, a corporation of Delaware
Filed Feb. 20, 1962, Ser. No. 174,614
11 Claims. (Cl. 340—172.5)

This invention relates to measuring and recording a plurality of signals.

Several types of analytical instruments are known which provide a plurality of output signals in sequence that are representative of the individual components of a material being analyzed. Once such analyzer utilizes the principles of chromatography. A sample of a fluid mixture to be analyzed is introduced into a column which contains material that selectively retards passage therethrough of the individual components of the sample. A carrier gas is then directed through the column to elute the individual constituents in sequence. These constituents normally are detected by means of a thermal conductivity cell which measures the heat conductivity of the effluent gas from the column. The detector cell usually comprises a temperature sensitive resistance element which is connected in a bridge network so that an output voltage signal is established. Another type of analyzer which provides a plurality of output signals in sequence is a mass spectrometer. By varying either a magnetic field which deflects the charged particles or a potential which accelerates the charged particles toward the collector, the associated detector responds in sequence to charged particles having different masses. The detector circuit normally provides an output voltage representative of the rate of impingement of charged particles on the collector.

Heretofore, it has been the general practice to measure or record directly the analog voltages established by the detecting circuits of such analyzers. However, these recorded voltages cannot always be identified or interpreted readily by an operator in an industrial plant. In addition, it is often difficult for an operator to calculate the concentration of individual components of a sample mixture from the recorded voltages.

In accordance with an improved system disclosed and claimed in copending application Serial No. 174,489, filed February 20, 1962, by Marvin C. Burk, C. E. Jones and Harold M. Neer, there is provided analysis apparatus comprising an analyzer adapted to provide a plurality of output voltages in sequence, each representative of a component of the material being analyzed; converter means to provide a fluctuating output signal, the frequency of which is proportional to the amplitude of the input voltage; means to apply the output voltages from said analyzer to the input of said converter means; first and second signal counting means; means to apply all of the output signals from said converter means to said first counting means so as to register the total output of said converter means; means to apply individual output signals from said converter means to said second counting means in sequence; delay means; means for applying the output signals of said second counting means to said delay means in sequence; means for dividing; means for transferring the output of said first counting means to said means for dividing; and means for transferring said second counting means output signals from said delay means to said means for dividing in sequence to divide each of said second counting means output signals by said output of said first counting means.

In accordance with the invention there is provided apparatus for recording a plurality of signals in sequence, each of said signals comprising a series of pulses; comprising, a counter; means for applying said plurality of signals in sequence to an input of said counter; an "and" circuit; means for applying the output of said counter to a first input of said "and" circuit; means for transmitting a gating pulse to a second input of said "and" circuit corresponding to the termination of each of said signals; means for converting the output of said "and" circuit into a form suitable for controlling an automatic recording means; and means for applying the output of said means for converting to an input of said recording means.

Accordingly it is an object of this invention to provide method and apparatus for measuring and recording a plurality of signals. Another object of the invention is to provide apparatus for measuring and recording a plurality of signals which are received in sequence. A still further object of the invention is to provide a method and apparatus for converting a plurality of electrical serial pulse form signals, the number of which is representative of a signal magnitude, into a form suitable for utilization with an automatic typewriter. A still further object of the invention is to provide an improved method and apparatus for recording the output of analytical instruments. A still further object of the invention is to provide improved method and apparatus for measuring a plurality of signals, producing an output representative of each signal as a percentage of the total of said signals and recording each of the outputs.

Other aspects, objects, and advantages of the invention will become apparent from a study of the disclosure, the drawing, and the appended claims.

In the drawings FIGURE 1 is a schematic representation of an analyzing system embodying the present invention;

FIGURE 4 is a schematic representation of a scanner system which can be utilized in the system of FIGURE 2;

FIGURE 5 is a schematic representation of a comparator and carriage control logic system which can be utilized in the system of FIGURE 2.

Figure 1:
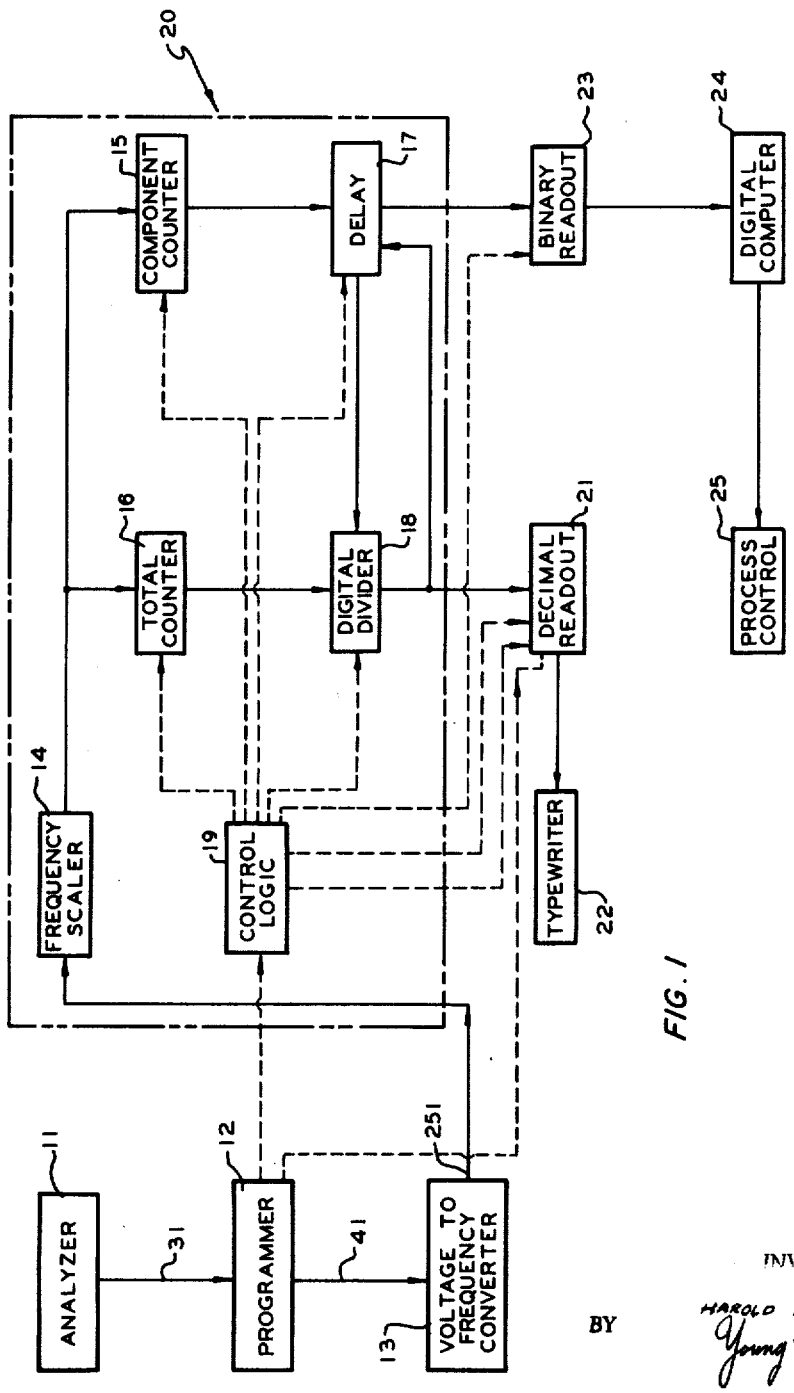

Referring now to the drawing in detail and to FIGURE 1 in particular there is shown an analyzer 11, which can be any suitable analyzer such as a chromatographic analyzer or a mass spectrometer. The analog voltage output signal from the analyzer is transmitted to programmer 12 where it can be amplified, compensated for detector response, and scaled by the desired full scale range factor. A voltage-to-frequency converter 13 converts the output signal from programmer 12 to a series of pulses with a frequency proportional to the amplitude of the programmer output signal. A suitable converter for this purpose is the DY-2210 converter, manufactured by Dymec Inc., Palo Alto, California, and which is described in Control Engineering, March 1959, page 144. The number of pulses generated from the time the programmer output signal leaves the base line until it returns to the base line represents the time integral of the component peak.

The output of converter 13 is applied to the input of a frequency scaler 14. Frequency scaler 14 comprises a plurality of frequency dividing circuits such that the frequencies of the output signals from the frequency dividing circuits are preselected fractions of the frequency F of the input signal. Thus, the frequencies of the output signals of the frequency dividing circuits can be, for example, F, F/2, F/4, F/8, etc. The output of frequency scaler 14 can be connected to the output of the frequency dividing circuit having the desired ratio. The output of frequency scaler 14 is connected to the inputs of component counter 15 and total counter 16. Total counter 16 counts all the pulses in the output signal of frequency scaler 14 as a measurement of the integral of all components combined. Component counter 15 counts the pulses in the output of frequency scaler 14 for a first interval corresponding to a first component as a measurement of the integral of said first component. The count corresponding to the first component is then transferred to delay 17 wherein it is stored. If more than one range factor is utilized, the range factor corresponding to the respective component is also transmitted to delay 17 along with the component count. Component counter 15 is then reset for a second interval of operation corresponding to the second component. At the end of the second interval the count is transferred from component counter 15 to delay 17 wherein it is stored and component counter 15 is again reset for another interval of operation. This procedure is repeated until the integral of each of the components has been stored in delay 17. The output of total counter 16 is then transmitted to digital divider 18. The individual component integral signals are transmitted in sequence from delay 17 to digital divider 18 wherein they are normalized by dividing each component signal by the output signal from total counter 16. The location of the decimal point for each component is determined by the respective range factor. The operation of component counter 15, total counter 16, delay 17 and digital divider 18 can be controlled by control logic system 19, which in turn can be controlled by programmer 12. Counters 15 and 16, delay 17, digital divider 18, and control logic 19 constitute normalizing computer 20.

The output of digital divider 18 is in serial pulse form with each pulse representing a certain percentage increment. The output of digital divider 18 is transmitted to the input of decimal readout system 21 wherein it is converted into a 10-line serial pulse output required by the control solenoids of typewriter 22. The 10-line serial pulse output of decimal readout 21 is transmitted along with appropriate control signals to typewriter 22. The operation of decimal readout system 21 can be controlled by signals from control logic 19 and programmer 12.

The normalized data can be returned to delay 17 for storage until needed. At a command from control logic 19, binary readout 23 can transfer the data to digital computer 24 in binary code. The output of computer 24 can be utilized in process control 25 to manipulate selected variables of a process.

Figure 2:
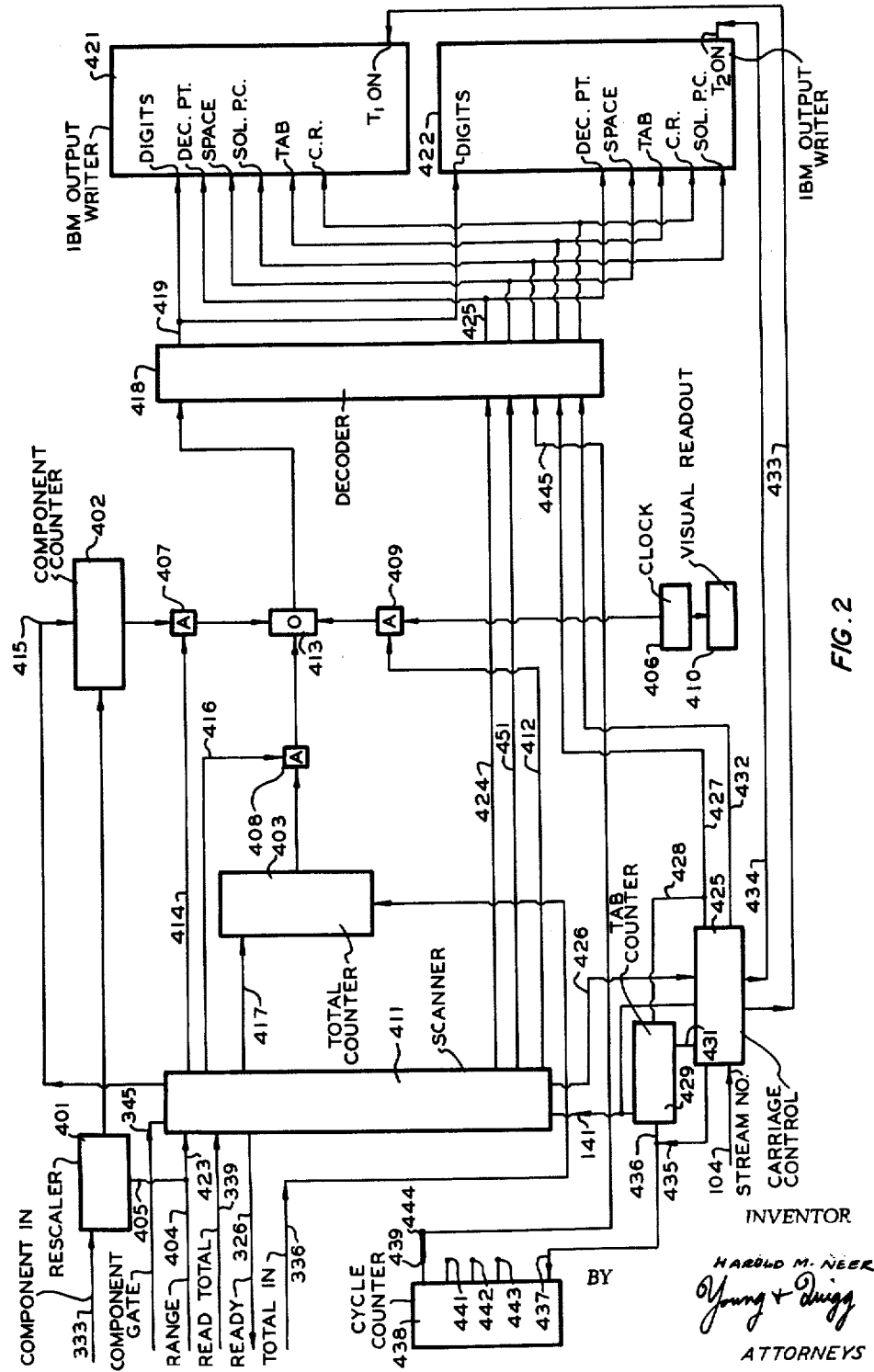
FIGURE 2 is a schematic representation of a decimal readout system which can be utilized in the system of FIGURE 1.

Referring now to FIGURE 2 the normalized component output of computer 20 is in serial pulse form and is transmitted through line 333 and rescaler 401 to component counter 402. The serial pulse output of computer 20 is also transmitted through line 336 to total counter 403. Component counter 402 and total counter 403 can be any suitable conventional counters, such as an array of DC-1 decade counter modules manufactured by Packard Bell Computer Corporation. The DC-1 counter modules comprise four flip flop circuits gated to count from zero through nine in the 8-4-2-1 binary coded decimal code.

In many applications it is desirable for convenience in the construction and operation of computer 20 to utilize some suitable power of 2, such as 8192, pulses as full scale value. Rescaler 401 can be utilized to add additional pulses to the serial pulse output of computer 20 in order to obtain the base of 10,000 pulses as full scale value for component counter 402 to make the output of component counter 402 a percentage after insertion of a decimal point. If it is desired to utilize more than one range, a range signal can be transmitted from computer 20 through lines 346, 347, 348 and 349, represented by cables 404 and 405, to rescaler 401. The range factor is applied as an input to rescaler 401 to reconvert the component signals to 10,000 full scale.

A clock 406 can be provided to furnish a time-of-day signal which can be printed with the recording of each analysis. A visual readout 410 can be provided to enable the operator to determine the setting of clock 406.

The outputs of component counter 402, total counter 403, and clock 406 appear in parallel binary-coded-decimal form and are transmitted to "and" circuits 407, 408 and 409 respectively. A scanner 411 is provided to scan the outputs of the component counter 402, total counter 403, and clock 406 for the purpose of selecting one of the output signals for recording. When scanner 411 is ready for operation, the scanner is set for component readout and a "ready" signal is transmitted through line 326 to computer 20. When computer 20 begins to transmit the signals of an analysis to decimal readout 19, a "S" signal is transmitted from computer 20 through line 345 to scanner 411, the length of the "S" signal being equivalent to the time required for the pulses representing the respective component. The trailing edge of the "S" signal acts as a "component gate" control signal for scanner 411. Prior to the receipt of the "component gate" signal corresponding to the first component, scanner 411 produces a "time readout" signal which is transmitted through cable 412 to "and" circuit 409. Upon the application of a signal to "and" circuit 409 through cable 412, "and" circuit 409 passes the output of clock 406 to "or" circuit 413. When the pulses corresponding to a component have been counted by component counter 402, the "component gate" signal from computer 20 being transmitted through line 345 terminates, causing scanner 411 to transmit an output signal through cable 414 to "and" circuit 407. Upon the occurrence of an input to "and" circuit 407 from both component counter 402 and scanner 411, "and" circuit 407 passes the output of component counter 402 to "or" circuit 413. After the output signal of component counter 402 has been transmitted to "or" circuit 413, scanner 411 produces a reset signal which is transmitted along line 415 to component counter 402 to reset component counter 402 to zero. At the conclusion of an analysis a "read" total signal is transmitted from computer 20 through line 339 to scanner 411 which in turn transmits a gating signal through cable 416 to "and" circuit 408. Upon the application of a gating signal to "and" circuit 408 through cable 416, "and" circuit 408 passes the output signal of total counter 403 to "or" circuit 413. After the output signal of total counter 403 has been transmitted to "or" circuit 413, scanner 411 produces a reset signal which is transmitted along line 417 to total counter 403 to reset counter 403 to zero.

"Or" circuit 413 passes the outputs of "and" circuits 407, 408 and 409, as each appears, to decoder 418. Decoder 418 converts the output of "or" circuit 413, which is in binary-coded-decimal form, into a 10-line serial pulse form, one digit at a time, which is then transmitted through 10 individual lines, shown schematically as cable 419 in the drawing, to automatic typewriters 421 and 422. Each of the individual lines corresponds to a decimal number.

A range factor corresponding to each component is transmitted from computer 20 through cables 404 and 423 to scanner 411 wherein it is utilized to select the proper positioning of the decimal point in the respective component percentage recording. Scanner 411 transmits a decimal point control signal through line 424 to decoder 418. Decoder 418 transmits a decimal point signal at the proper time through line 425 to typewriters 421 and 422.

Carriage control 425 is provided to control the position of the carriages of typewriters 421 and 422. If it is desired to analyze more than one stream, programmer 12 transmits a signal representing the stream being analyzed through line 104 to carriage control 425.

In multiple stream operation, after the total of each stream analysis is printed, scanner 411 produces a "tab" signal which is transmitted along line 426 to carriage control 425. Carriage control 425 then passes a "tab" signal through line 427 to position the carriage of the typewriter to be operated to correspond with the next stream to be analyzed. Each "tab" signal that is transmitted along line 427 is also transmitted along line 428 to tab counter 429 wherein the total number of "tab" signals is registered. Carriage control 425 can be provided with a stream selection control so that a certain stream can be repeatedly analyzed without sequencing through all of the streams being analyzed in a multiple stream analysis. When carriage control 425 is utilizing the stream selection control, a comparison is made between the "stream number" signal transmitted from programmer 12 to carriage control 425 along line 104 with the output of the counter 429 which is transmitted to carriage control 425 along line 431. If the normal stream sequence is being followed the output of tab counter 429 and the "stream number" signal on line 104 will be equal and carriage control 425 will not produce any additional "tab" signals. However, if it is desired to skip the next stream, the output of tab counter 429 and the "stream number" signal on line 104 will not be equal and carriage control 425 will produce additional "tab" signals to be transmitted along line 427 until equality between the tab counter output and the "stream number" signal is achieved.

When the total of the last stream for a given typewriter is printed or such last stream has been skipped, carriage control 425 produces a "carriage return" signal which is transmitted along line 432 to the respective typewriter to reposition the typewriter carriage for the next cycle.

In multiple stream operations where two or more typewriters are required or are desired, carriage control 425 actuates the proper typewriter by passing a "on-off" signal along line 433 or line 434 to typewriter 421 or 422, respectively. At the conclusion of the analysis of the last stream, carriage control 425 produces an output signal which is transmitted along lines 435 and 436 to reset tab counter 429 to zero. The output signal is also transmitted along lines 435 and 437 to the input of cycle counter 438. Cycle counter 438 has a plurality of outputs 439, 441, 442 and 443 with each output being a fraction of the input C to cycle counter 438. Thus, outputs 439, 441, 442, and 443 can be, for example, C, C/2, C/4, and C/8. Thus in applications where it is desirable to print data less frequently than the analyses are made, switch 444 can be set to the output of cycle counter 438 corresponding to the desired ratio of cycles to be printed. Thus, if it is desired to print only every fourth cycle, switch 444 could be set to output terminal 442. The signal applied to switch 444 is transmitted along line 445 to typewriters 421 and 422 to inhibit printing except during the desired data cycles.

Figure 3:
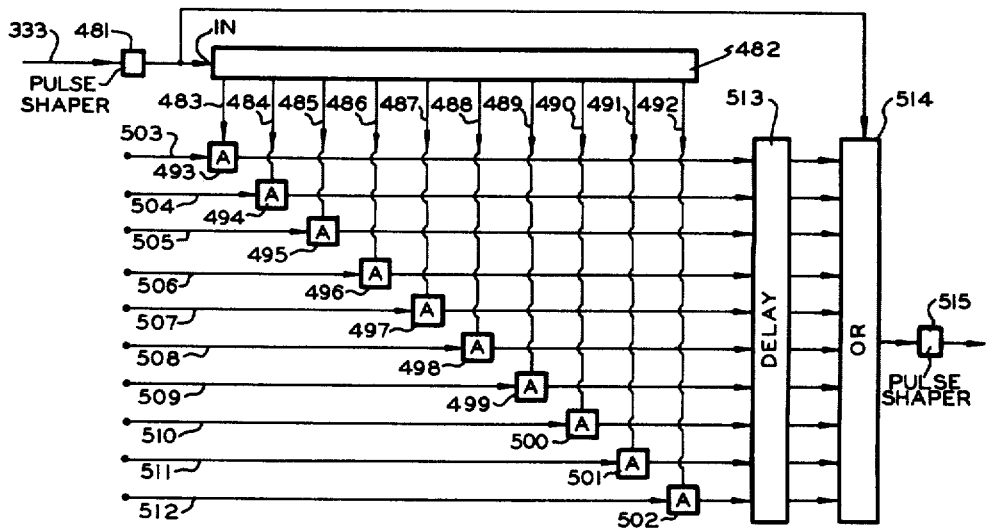
FIGURE 3 is a schematic representation of a rescaler which can be utilized in the decimal readout system of FIGURE 2.

Referring now to FIGURE 3 there is shown a rescaler system which is suitable for utilization in the system of FIGURE 2. The serial pulse input is applied through line 333 and pulse shaper 481 to the input of counter 482, which can be any suitable counter, such as a cascade of BC-1 binary counter modules manufactured by Packard Bell Computer Corporation. Binary counter 482 has a plurality of output terminals 483, 484, 485, 486, 487, 488, 489, 490, 491 and 492. To obtain better resolution of smaller components three ranges of 100 percent, 10 percent and 1 percent can be utilized with a full scale output from computer 20 being represented on a 100 percent range by a suitable number such as 8192 serial pulses. Since range changes in the computer 20 are desirably associated with binary register shifts, factors of 8 rather than 10 can be used in that portion of the system so that on the 10 percent range the component size will be decreased by 10 while the relative output will be increased by 8 giving 8192×(8/10) or 6553.6 pulses as full scale on the 10 percent range. Similarly, full scale on the 1 percent range will be 8192×(8/10)×(8/10) or 5242.88 pulses.

For convenience in converting the output of component counter 402 to percentage form it is desirable that the input to component counter 402 have a full scale value of 10,000 pulses. Thus, it is necessary to rescale each of the 100 percent, 10 percent and 1 percent full scale values to 10,000. A signal appears on output terminal 483 for every other signal received as an input to counter 482. Similarly a signal appears on terminal 484 for every fourth input signal, on terminal 485 for every eighth input signal, on terminal 486 for every sixteenth input signal, on terminal 487 for every thirty-second input signal, on terminal 488 for every sixth-fourth input signal, on terminal 489 for every 128th input signal, on terminal 490 for every 512th input signal, on terminal 491 for every 1024th input signal, and on terminal 492 for every 2048th input signal. Output terminals 483–492 are connected to "and" circuits 493–502, respectively.

A range signal is transmitted from computer 20 to rescaler 401 to apply a signal to terminals 503, 508, 510 and 512 for every 100 percent range; to apply a signal to terminals 504, 505, 507, 509 and 512 for a 10 percent range; and to apply a signal to terminals 504, 506, 508, 510 and 511 for a 1 percent range. The signals applied to terminals 503–512 are applied as inputs to "and" circuits 493–502, respectively. When the application of a signal to an "and" circuit from its respective output of counter 482 and from its respective range input terminal occurs, a pulse is passed to delay 513 wherein it is stored for a short time to provide minimum spacing between pulses in the input to component counter 402 and then applied to "or" circuit 514. The output of pulse shaper 481 is also applied as an input to "or" circuit 514. Upon the application of a pulse to any of the inputs of "or" circuits 514 an output pulse is transmitted through pulse shaper 515 to component counter 402.

Referring now to FIGURE 4 there is shown a scanner system which can be utilized in the system of FIGURE 2. The "component gate" signal is transmitted through line 345, inverter 521, and "or" circuit 522 to scan counted 523. Scan counter 523 can be any suitable conventional counter such as a BC-1 binary counter, manufactured by Packard Bell Computer Corporation.

Upon actuation by the output of "or" circuit 522, scan counter 523 is advanced at a suitable rate, such as 5-8 counts per second. Scan counter 523 normally rests in the "zero" position but when advanced to the "one" position by a "start scan" signal from "or" circuit 522, will free run at the scan rate until reset to "zero." The output of scan counter 523 comprises the individual outputs of four separate flip flop circuits, each of which is transmitted along cables 524, 525, and 526 to component scan decoder 527, total scan decoder 528 and time scan decoder 529, respectively. Each of decoders 527, 528 and 529 comprises an array of "nor" circuits. The first position output of flip flop circuit 531 is transmitted along lines 533 and 534 to component scan decoder 527 and time scan decoder 529, respectively. The second position output flip flop circuit 531 is transmitted along line 535 to total scan decoder 528. The first position output of flip flop circuit 532 is transmitted along lines 536 and 537 to component scan decoder 527 and total scan decoder 528, respectively. The second position output of flip flop circuit 532 is transmitted along line 538 to time scan decoder 529. Only the scan decoder receiving a "false" input signal from both flip flop circuits 531 and 532 will be actuated; the other two scan decoders will receive a "true" signal from one of the flip flop circuits and a "false" signal from the other flip flop circuit and will remain in a deactuated state. Flip flop circuit 531 is actuated to a first state by a "read total" input signal transmitted from computer 20 along line 339 and is actuated to a second state by a reset signal transmitted along line 539. Flip flop circuit 532 is actuated to a first state by a "time set" signal transmitted along line 541, and is actuated to a second state by the reset signal transmitted along line 539.

Component scan decoder 527 produces an output at terminal 542 when component scan decoder 527 is in the "zero" or rest position. Output terminals 543, 544 and 545 correspond to the decimal position for the 1 percent, 10 percent and 100 percent ranges, respectively. Output terminals 543, 544 and 545 are connected to respective inputs of "nor" circuit 546 and also to the respective input terminals of decimal point logic 547. Decimal point logic 547 compares the range input signal transmitted along cable 423 with the scanning position of scan decoder 527 and produces an output corresponding to the correct position of the decimal point which is transmitted along line 548 to "nor" circuit 549. The output of "nor" circuit 546 is applied to an input of "nor" circuit 549 with the output of "nor" circuit 549 being transmitted along line 424 to decoder 418. The output signals on terminals 414a, 414b, 414c and 414d correspond to the first, second, third and fourth digits, respectively, and are transmitted along cable 414 to "and" circuit 407. The outputs on terminals 451a and 451b result in causing the typewriter to space between component readouts. A signal appears on output terminal 551 at the conclusion of the component scan decoding operation and is transmitted along line 415 to reset component counter 402. The output signal at terminal 551 is also transmitted along line 326 as a "ready" signal to computer 20.

Output signals on terminals 416a, 416b, 416c, 416d and 416e correspond to the five digits of total counter 403 and are transmitted along cable 416 to "and" circuit 408. The output on terminals 552 corresponds to the "tab" signal which is transmitted along line 426 to carriage control 425. An output is applied to terminal 553 at the conclusion of the readout of the total counter 403 and is transmitted along line 417 to reset total counter 403. An output is applied to terminal 554 when the time scan decoder is at "zero" or reset position. The outputs on terminals 412a, 412b, 412c and 412d correspond to the four digits on the readout of clock 406 and are transmitted along cable 412 to "and" circuit 409. The outputs on terminals 451c and 451d are transmitted along cable 451 causing the typewriter to space after the printing of the time. A signal is applied to terminal 555 at the conclusion of the readout of the time from clock 406.

The "scan rest" signals on terminals 542 and 554 are transmitted along lines 557 and 558 to "or" circuit 559. The output of "or" circuit 559 is transmitted through inverter 561 to "and" circuit 562. The output of "or" circuit 522 is passed through delay 563 to a second input of "and" circuit 562. The output of "and" circuit 562 is applied as an input to "or" circuit 522. Delay 563 and "and" circuit 562 in combination with the inverted "scan rest" signals appearing at terminals 542 and 554 thus constitute a system for maintaining the stepping of scan counter 523 until the scanning operation has been completed.

Reset terminals 551, 553 and 555 are connected to the inputs of "or" circuit 564, through lines 565, 566 and 567, respectively. The output of "or" circuit 564 is applied as a reset signal to scan counter 523 to reset the scan counter to zero.

Referring now to FIGURE 5 there is disclosed a carriage control system which is suitable for utilization in the system of FIGURE 2. At the completion of the readout of total counter 403 a "tab" signal is obtained from terminal 552 of total scan decoder 528 and transmitted along line 426 to "or" circuit 571. The output of "or" circuit 571 is transmitted through line 572, delay 573 and line 427 to the typewriter being operated. The output of delay 573 is transmitted through line 428 to tab counter 429 which registers the number of tab signals. The output of delay 573 is transmitted through delay 574 and line 575 to "and" circuit 576. In a multiple stream analysis operation utilizing a stream selection control, the output of tab counter 429 is transmitted through line 431 to an input of comparator 577. Comparator 577 compares the "stream number" signal on line 104 with the output of tab counter 429 and if they are not equal, an output signal is transmitted through line 578 to "and" circuit 576. Thus a tab signal is transmitted along line 427 at the completion of the readout of total counter 403 and also for streams to be omitted under the direction of the stream selection control.

The output of tab counter 429 is transmitted through line 579 to decoder 581 which comprises an array of "nor" circuits. In operations utilizing more than one typewriter, switch 582 is employed to transfer the output of decoder 581 to the respective typewriter control. The multiple output of decoder 581 is thus passed through cable 583, switch 582, and cable 584 to "nor" circuit 585; or through cable 583, switch 582 and cable 586 to "nor" circuit 587. The output of "nor" circuit 585 is passed through line 588, and inverter 589 and line 433 to the on-off control of typewriter 421. The output of "nor" circuit 587 is transmitted through line 591, inverter 592, and line 434, to the on-off control of typewriter 422. One of the output lines in cable 584 is connected to one input of "or" circuit 593, and one of the output lines in cable 586 is connected to a second input of "or" circuit 593. The output of "or" circuit 593 is connected to an input of "and" circuit 594. The output of delay 574 is connected through an inverter 595 to a second input of "and" circuit 594. The output of "and" circuit 594 is transmitted through line 541 to one input of flip flop circuit 532 in scanner 411. The output of "and" circuit 594 is also transmitted through delay 596 and line 432 to the carriage return controls in typewriters 421 and 422.

Figure 6:
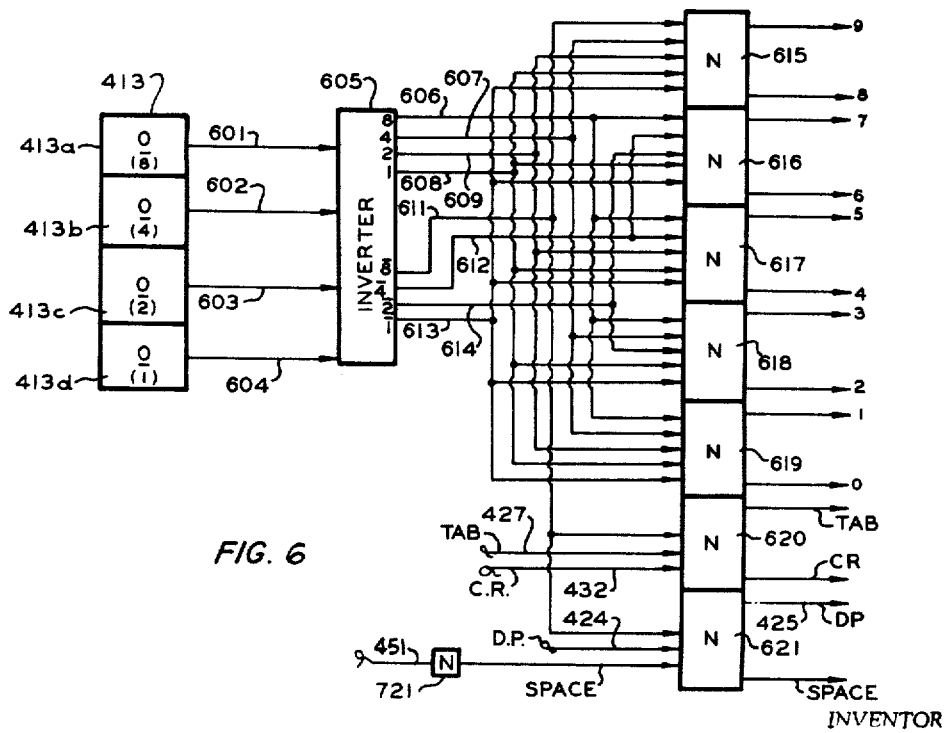
FIGURE 6 is a schematic representation of a decoding system which can be utilized in the system of FIGURE 2.

Referring now to FIGURE 6 there is shown a decoding circuit which is suitable for utilization in the system of FIGURE 2 and which will be described as decoder 418. "Or" circuit 413 comprises a cascade of four individual "or" circuits 413a, 413b, 413c and 413d the outputs of which represent $\bar{8}$, $\bar{4}$, $\bar{2}$ and $\bar{1}$ where the bar above the number signifies that that number is not present. The output of "or" circuits 413a, 413b, 413c and 413d are transmitted through lines 601, 602, 603 and 604, respectively, to inverter 605 wherein it is inverted once and applied to output terminals 606, 607, 608 and 609, respectively. The signals appearing on lines 601, 602, 603 and 604 are inverted twice and applied to output terminals 611, 612, 613 and 614 respectively. The term "inverted" is used to signify that a false signal has been changed to a true signal and similarly a true signal has been changed to a false signal. Output terminals 606, 607, 608, 609, 611, 612, 613 and 614 are connected to selected input terminals of "nor" circuits 615, 616, 617, 618, 619, 620 and 621. Each of the "nor" circuits comprises two "nor" gates having corresponding outputs. Thus "nor" circuit 615 has outputs corresponding to the decimal number 9 and to the decimal number 8. The upper three input terminals in "nor" circuits 615–619 are common to both of the "nor" gates in each respective "nor" circuit with each of the remaining two input terminals being connected to only one of the "nor" gates. The outputs of "nor" circuits 615–619 are transmitted through cable 419 to typewriters 421 and 422 to cause the print out of the respective decimal number by the typewriter which is being operated. Tab signal and carriage return signals are applied through lines 427 and 432 to "nor" circuit 620 while decimal point and space signals are applied through lines 424 and 451 to "nor" circuits 621 and 721, respectively. The output of "nor" circuit 721 is applied as an input to "nor" circuit 621. "Nor" circuit 721 is provided to give a false signal at the input to "nor" circuit 621 for a true signal on terminals 451a, 451b, 451c, or 451d. If all of the signals to a "nor" gate are false (zero volts) the "nor" gate will produce an output, but if any one of the inputs to the "nor" gate is true the output of the "nor" gate will be zero.

The particular details of programmer 12 are the claimed subject matter of copending application Serial No. 174,543, filed February 20, 1962, by Marvin C. Burk and Charles E. Jones, now U.S. Patent 3,119,995, and are incorporated herein by reference. The particular details of the computer system of FIGURE 1 are part of the claimed subject matter of copending application Serial No. 174,489, filed February 20, 1962, by Marvin C. Burk, Charles E. Jones and Harold M. Neer, and are incorporated herein by reference.

Reasonable variation and modification are possible within the scope of the disclosure, the drawing and the appended claims to the invention.

I claim:

1. Apparatus for recording a plurality of component signals in sequence, each of said component signals being representative of a component of a material being analyzed and comprising a series of pulses; comprising, means for rescaling the full scale value of each of said component signals to a power of 10; a component counter; means for applying the output of said means for rescaling to an input of said component counter; a total counter; means for applying a total signal representing the total of said plurality of component signals for each analysis to an input of said total counter; clock means for producing a time signal representing the time of day; first, second, and third "and" circuits; means for applying the outputs of said component counter, said total counter and said clock means to first inputs of said first, second, and third "and" circuits, respectively; scanning means; means for transmitting a first gating pulse from said scanning means to a second input of said first "and" circuit corresponding to the termination of each of said component signals; means for transmitting a second gating pulse from said scanning means to a second input of said second "and" circuit subsequent to the termination of the first gating pulse corresponding to the last component of each analysis; means for transmitting a third gating pulse from said scanning means to a second input of said third "and" circuit at the beginning of each analysis cycle; an "or" circuit; means connecting the outputs of said first, second and third "and" circuits to respective inputs of said "or" circuit; means for converting the output of said "or" circuit into a 10-line serial pulse output; an automatic typewriter, and means for applying said 10-line serial pulse output to an input of said typewriter.

2. Apparatus in accordance with claim 1 further comprising means to reset said component counter after each rescaled component signal is applied thereto.

3. Apparatus for recording a plurality of different variable analog signals in sequence, comprising means for converting each of said analog signals into a corresponding digital signal comprising a series of pulses, the number of pulses in each series being representative of the respective analog signal; a digital counter; means for applying in sequence the digital signals thus produced to an input of said counter; an "and" circuit; means for applying the output of said counter to a first input of said "and" circuit; means for transmitting a gating pulse to a second input of said "and" circuit corresponding to the termination of each of said digital signals; an automatic recording means; means for producing signals for controlling said automatic recording means responsive to the output of said "and" circuit; and means for applying the signals from said means for producing to an input of said automatic recording means.

4. Apparatus for recording a plurality of signals in sequence, each of said signals comprising a series of pulses; comprising, a first counter; means for applying said plurality of signals in sequence to an input of said first counter; a second counter; means for applying a total signal representing the total of said plurality of signals to an input of said second counter; first and second "and" circuits; means for applying the output of said first counter and said second counter to a first input of said first and second "and" circuits, respectively; means for transmitting a first gating pulse to a second input of said first "and" circuit corresponding to the termination of each of said plurality of signals; means for transmitting a second gating pulse to a second input of said second "and" circuit subsequent to the termination of the first gating pulse corresponding to the last of said plurality of signals; an "or" circuit; means connecting the outputs of said first and second "and" circuits to respective inputs of said "or" circuit; an automatic recording means; means for converting the output of said "or" circuit into a form suitable for controlling said automatic recording means; and means for applying the output of said means for converting to an input of said automatic recording means.

5. Apparatus for recording a plurality of signals in sequence, each of said signals comprising a series of pulses; comprising, a first counter; means for applying said plurality of signals in sequence to an input of said first counter; a second counter; means for applying a total signal representing the total of said plurality of signals to an input of said second counter; clock means for producing a time signal; first, second, and third "and" circuits; means for applying the outputs of said first counter, said second counter and said clock means to first inputs of said first, second, and third "and" circuits, respectively; means for transmitting a first gating pulse to a second input of said first "and" circuit corresponding to the termination of each of said plurality of signals; means for transmitting a second gating pulse to a second input of said second "and" circuit subsequent to the termination of the first gating pulse corresponding to the last of said plurality of signals; means for transmitting a third gating pulse to a second input of said third "and" circuit at the beginning of each recording cycle; an "or" circuit; means connecting the outputs of said first, second and third "and" circuits to respective inputs of said "or" circuit; an automatic recording means; means for producing signals for controlling said automatic recording means responsive to the output of said "or" circuit; and means for applying the output of said means for producing signals to an input of said automatic recording means.

6. Apparatus for recording the output of an analyzer for a plurality of analyses wherein the analyzer output for each analysis comprises a plurality of component signals in sequence, each of said component signals being representative of a component of a material being analyzed; comprising first converting means for converting each of said component signals to a series of pulses; a first counter; means for applying the output of said first converting means to an input of said first counter; an "and" circuit; means for applying the output of said first counter to a first input of said "and" circuit; means for transmitting a first gating pulse to a second input of said first "and" circuit corresponding to the termination of each series of pulses; second converting means for converting the output of said "and circuit into a form suitable for controlling an automatic recording means; an automatic recording means; and means for applying the output of said second converting means to an input of said automatic recording means.

7. Apparatus for recording the output of an analyzer for a plurality of analyses wherein the analyzer output for each analysis comprises a plurality of component signals in sequence, each of said component signals being representative of a component of a material being analyzed; comprising first converting means for converting each of said component signals to a series of pulses; a first counter; means for applying the output of said first converting means to an input of said first counter; a second counter; means for applying a total signal representing the total of said plurality of component signals to an input of said second counter; clock means for producing a time signal representing the time of day;

first, second, and third "and" circuits; means for applying the outputs of said first counter, said second counter and said clock means to first inputs of said first, second, and third "and" circuits, respectively; means for transmitting a first gating pulse to a second input of said first "and" circuit corresponding to the termination of each series of pulses; means for transmitting a second gating pulse to a second input of said second "and" circuit subsequent to the termination of the first gating pulse corresponding to the last component of each analysis; means for transmitting a third gating pulse to a second input of said third "and" circuit at the beginning of each analysis cycle; an "or" circuit; means connecting the outputs of said first, second, and third "and" circuits to respective inputs of said "or" circuit; an automatic recording means; second converting means for producing signals for controlling said automatic recording means responsive to the output of said "or" circuit; and means for applying the output of said second converting means to an input of said automatic recording means.

8. Apparatus for recording the output of an analyzer for selected analyses of a plurality of analyses wherein the analyzer output for each analysis comprises a plurality of component signals in sequence, each of said component signals being representative of a component of a material being analyzed and comprising a series of pulses; comprising a first counter; means for applying said plurality of component signals in sequence to an input of said first counter; a second counter; means for applying a total signal representing the total of said plurality of component signals for each analysis to an input of said second counter; clock means for producing a time signal; first, second, and third "and" circuits; means for applying the outputs of said first counter, said second counter and said clock means to first inputs of said first, second, and third "and" circuits, respectively; means for transmitting a first gating pulse to a second input of said first "and" circuit corresponding to the termination of each said series of pulses; means for transmitting a second gating pulse to a second input of said second "and" circuit subsequent to the termination of the first gating pulse corresponding to the last component of each analysis; means for transmitting a third gating pulse from said scanning means to a second input of said third "and" circuit at the beginning of each analysis cycle; an "or" circuit; means connecting the outputs of said first, second, and third "and" circuits to respective inputs of said "or" circuit; means for converting the output of said "or" circuit into a 10-line serial pulse output; an automatic typewriter; means for applying the output of said means for converting corresponding to the analyses which are to be recorded to an input of said typewriter; and means for blocking the output of said means for converting corresponding to the analyses which are not to be recorded.

9. Apparatus for recording selected cycles of a multiple stream analyzing system wherein the analyzer output for each stream analysis comprises a plurality of component signals in sequence, each of said component signals being representative of a component of a material being analyzed; comprising first converting means for converting each of said component signals into a series of pulses; a first counter; means for applying the output of said first converting means to an input of said first counter; an "and" circuit; means for applying the output of said first counter to a first input of said "and" circuit; means for transmitting a first gating pulse to a second input of said first "and" circuit corresponding to the termination of each series of pulses; an automatic recording means; second converting means for converting the output of said "and" circuit into a form suitable for controlling said automatic recording means; means for applying the output of said second converting means to an input of said automatic recording means; second counting means having a plurality of output terminals corresponding to different ratios of output to input; means for generating a pulse at the conclusion of each of said cycles; means connected to one of said output terminals to energize said automatic recording means upon an output pulse appearing at said one of said output terminals.

10. Apparatus for recording a plurality of component signals in sequence, each of said component signals being representative of a component of a material being analyzed and comprising a series of pulses; comprising a component counter; means for applying each of said plurality of component signals in sequence to an input of said component counter; a total counter; means for applying a total signal representing the total of said plurality of component signals for each analysis to an input of said total counter; clock means for producing a time signal; signal conversion means, the output of which is in a form suitable for controlling automatic recording means; means for applying the outputs of said component counter to an input of said signal conversion means in sequence; means for applying the output of said total counter to an input of said signal conversion means subsequent to the termination of the last component signal of each analysis; means for applying the output of said clock means to an input of said signal conversion means at the beginning of each analysis cycle; an automatic recording means; and means for applying the output of said signal conversion means to an input of said automatic recording means.

11. Apparatus for recording a plurality of component signals in sequence, each of said component signals being representative of a component of a material being analyzed and comprising a series of pulses; comprising a component counter; means for applying each of said plurality of component signals in sequence to an input of said component counter; a total counter; means for applying a total signal representing the total of said plurality of component signals for each analysis to an input of said total counter; signal conversion means, the output of which is in a form suitable for controlling automatic recording means; means for applying the outputs of said component counter to an input of said signal conversion means in sequence; means for applying the output of said total counter to an input of said signal conversion means subsequent to the termination of the last component signal of each analysis; an automatic recording means; and means for applying the output of said signal conversion means to an input of said automatic recording means.

References Cited in the file of this patent

UNITED STATES PATENTS

| | | |
|---|---|---|
| 2,680,240 | Greenfield | June 1, 1954 |
| 2,701,748 | Anderson | Feb. 8, 1955 |
| 2,719,285 | Greenfield | Sept. 27, 1955 |
| 2,793,806 | Lindesmith | May 28, 1957 |
| 2,899,567 | Romano | Aug. 11, 1959 |
| 2,905,930 | Golden | Sept. 22, 1959 |
| 2,953,777 | Gridley | Sept. 20, 1960 |